No. 700,902. Patented May 27, 1902.
W. A. CROWDUS.
MOTOR VEHICLE FRAME.
(Application filed June 25, 1901.)
(No Model.)
2 Sheets—Sheet 1.

Witnesses: Inventor:
Harold G. Barrett. Walter A. Crowdus,
By Geo. T. Waldo,
Atty.

THE NORRIS PETERS CO., PHOTO-LITHO., WASHINGTON, D. C.

No. 700,902. Patented May 27, 1902.
W. A. CROWDUS.
MOTOR VEHICLE FRAME.
(Application filed June 25, 1901.)
(No Model.) 2 Sheets—Sheet 2.

Witnesses: Inventor:
Walter A. Crowdus,
By
Atty.

UNITED STATES PATENT OFFICE.

WALTER A. CROWDUS, OF CHICAGO, ILLINOIS.

MOTOR-VEHICLE FRAME.

SPECIFICATION forming part of Letters Patent No. 700,902, dated May 27, 1902.

Application filed June 25, 1901. Serial No. 65,942. (No model.)

*To all whom it may concern:*

Be it known that I, WALTER A. CROWDUS, a citizen of the United States, and a resident of Chicago, in the county of Cook and State of Illinois, have invented an Improved Motor-Vehicle Frame, of which the following is a specification.

This invention relates to vehicle running-gears or underframes, and relates particularly to running-gears or underframes for motor-vehicles.

A primary object of the invention is to provide a running-gear or underframe particularly designed and adapted for motor-vehicles, which will embody the features of strength, lightness, and flexibility with simplicity of construction and cheapness of manufacture.

To this end a vehicle-frame of my invention consists of the various features, combinations of features, and details of construction hereinafter described and claimed.

In the accompanying drawings a vehicle-gear of my invention is fully illustrated.

Figure 1:
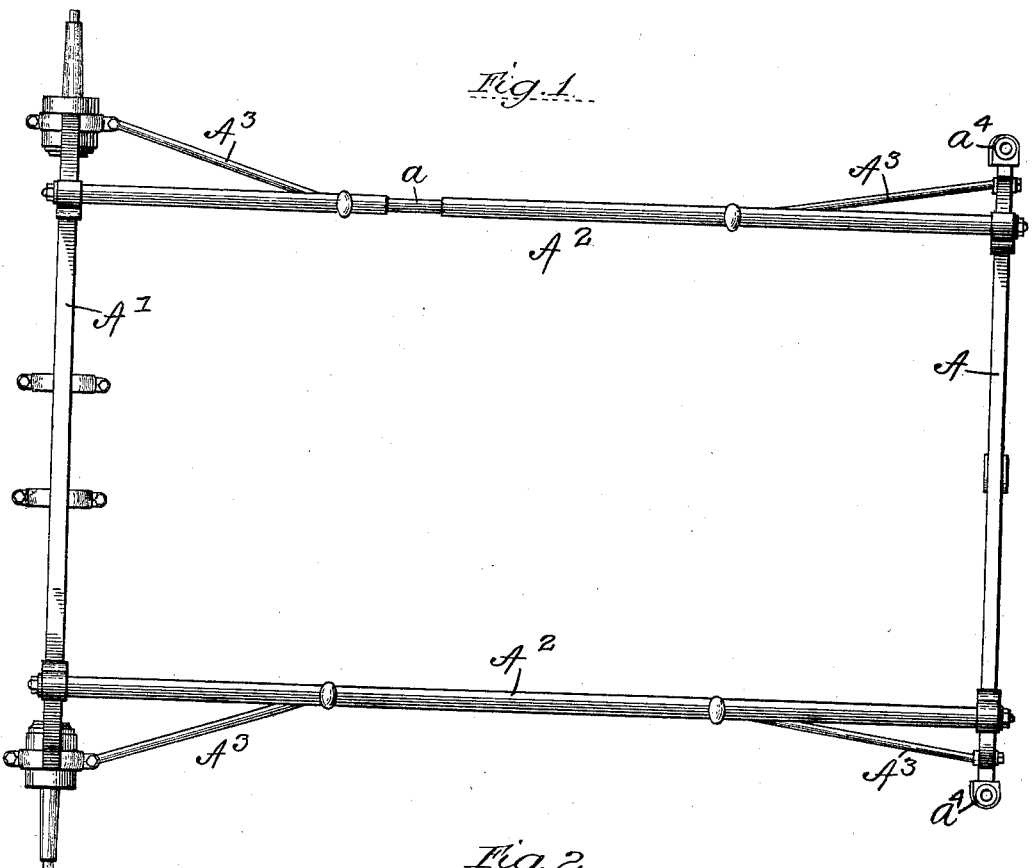
Figures 2, 5:
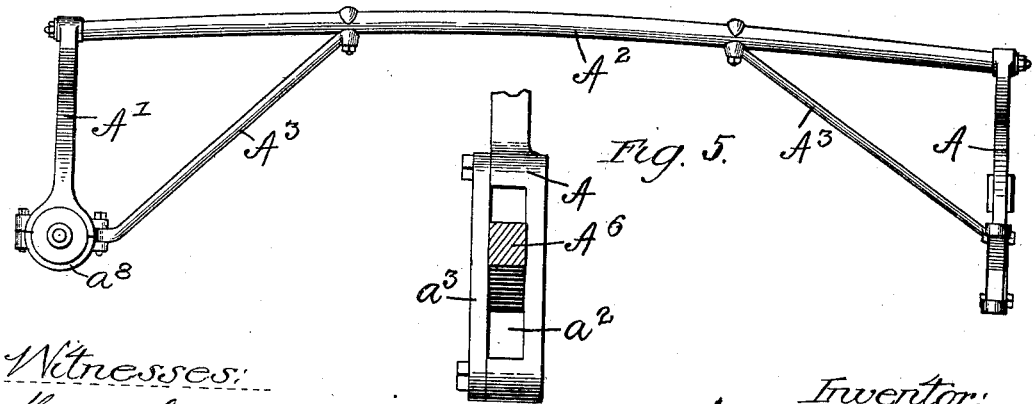
Figure 3:
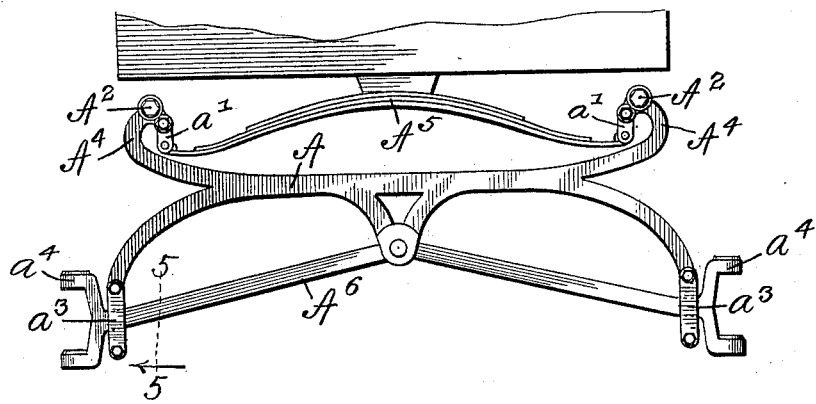
Figure 4:
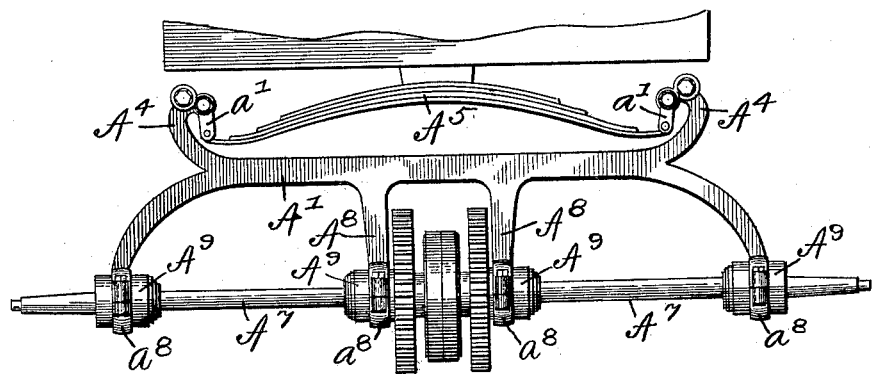
Figure 6:
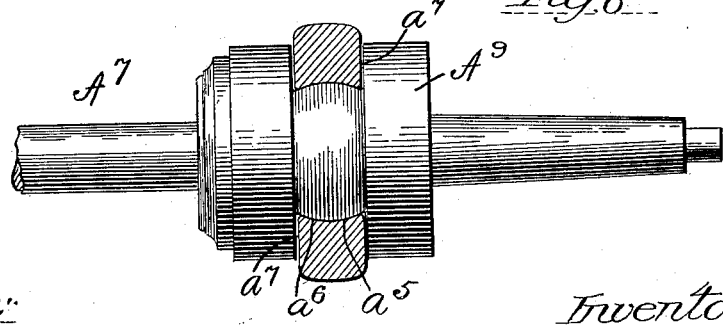

Figure 1 is a top plan view of a vehicle-gear of my invention. Fig. 2 is a side view thereof. Fig. 3 is a front end view thereof. Fig. 4 is a rear end view thereof, and Figs. 5 and 6 are detail sectional views.

A vehicle-gear of my invention comprises front and rear axle supports or bolsters $A$ $A'$, which are rigidly connected by side rods or bars $A^2$. The axle supports or bolsters $A$ $A'$ are preferably made of strong tough metal, as mild steel, and the side bars or rods $A^2$ of metal tubes, preferably steel. Preferably, also, the tubular side bars or rods $A^2$ are reinforced by rods $a$, of strong wood, as hickory, forced into the opening thereof. Struts or braces $A^3$ connect said axle supports or bolsters $A$ $A'$ and said side bars $A^2$ and impart additional strength and rigidity to the frame. Both the front and the rear axle supports have upwardly-extending arms or projections $A^4$, which are preferably located inside of the ends of said axle-supports. Preferably, also, said axle-supports are provided with downward extensions, which are preferably formed by the downwardly curved or bowed ends thereof. In the preferable construction shown the side bars or rods $A^2$ connect the axle-supports at or adjacent to the ends of the arms or projections $A^4$, and the struts $A^3$ connect said side bars at a distance from their ends with the axle-supports at or adjacent to the ends of the downward extensions thereof, and thus below and outside of said side bars. Said struts will thus extend diagonally downwardly and outwardly and will thus operate to brace and strengthen the vehicle-frame against both longitudinal and transverse strains.

The vehicle-body is carried on springs $A^5$, hung directly from the upper ends of the upward projections $A^4$ on the axle-supports, preferably by means of links $a'$, pivotally connected to both said projections and springs. Preferably, also, the relation of parts will be such that the tops of the springs $A^5$ will be substantially on a line with the points of attachment to said arms or projections $A^4$. Preferably and as shown, also, the upper ends of the arms or projections $A^4$ extend inwardly toward each other, thus providing ample room for the play of said springs $A^5$.

The front axle $A^6$ may be of any desired or approved form and may be made of any desired and suitable material. In the preferable construction shown said front axle is pivoted to the front-axle support or bolster at the middle thereof transversely and is kept in transverse alinement by suitable guides on the front-axle support $A$, which closely embrace said axle adjacent to its outer ends. As shown, said guides consist of slots $a^2$, formed in said front-axle support adjacent to the lower ends of the downwardly curved or bowed ends thereof. To provide for inserting said axle $A^6$ into said slots $a^2$, one side of each of said slots is formed by a plate $a^3$, removably secured to the axle-support. The slots $a^2$ are made sufficiently long to provide for desired pivotal movement or oscillation of said front axle $A^6$ relatively to the front-axle support $A$.

The stub-shafts (not shown) on which the front wheels (not shown) are mounted are pivoted in yokes or forks $a^4$ on the ends of the front axle $A^6$ in the usual manner.

The rear axle comprises separate sections $A^7$, independently mounted, so as to rotate freely, in suitable bearings formed in the ends of the downward extensions of the rear-axle support $A'$ and of downward arms or hangers $A^8$ on said rear-axle support adjacent to the center thereof. In the preferable construction shown the bearings for said rear axle are formed in separate boxes $A^9$, secured therein in proper position, so as to admit of limited oscillation in all directions. Self-alining bearings are thus provided, which will at once adjust themselves to slight variations in the positions of the sections of the axle due to springing of the rear-axle support or other cause, and thus prevent binding of the axle or of the sections thereof in their bearings, which would tend to make the axle run hard, possibly retarding the speed of the vehicle and needlessly consuming power.

As shown, the rear-axle bearings are rendered self-alining in the following manner: Formed in the lower ends of the downward extensions of the rear-axle support $A'$ and of the hangers $A^8$ are circular openings $a^5$, the inner surfaces of which are grooved spherically on a radius equal to one-half ($\frac{1}{2}$) of the maximum diameter of said openings, as shown in Fig. 6. Secured in said openings $a^5$ are the bearing-boxes $A^9$, said boxes being provided with external spherical surfaces $a^6$, adapted to engage the spherically-grooved openings $a^5$, formed in the axle-support. As shown, the spherical openings $a^5$ are formed at the bottoms of grooves $a^7$, which extend around said bearing-boxes $A^9$, said grooves $a^7$ being somewhat wider than the thickness of the downward extensions of the axle-support and of the hangers $A^8$ where the openings $a^5$ are formed, thus making provision for desired play of said bearing-boxes. In order to provide for assembling said rear-axle bearings, approximately one-half ($\frac{1}{2}$) of each of the openings $a^5$ is formed in a cap $a^8$, removably secured to rigid portions of the axle-support.

I claim—

1. A vehicle-frame comprising front and rear axle supports, upwardly-extending arms thereon, side bars connecting said arms on said axle-supports and struts or braces which connect said side bars with said axle-supports, substantially as described.

2. A vehicle-frame comprising front and rear axle supports, upward and downward projections thereon, side bars which connect said upward projections and struts or braces which connect said side bars with the downward extensions of said axle-supports, substantially as described.

3. A vehicle-frame comprising front and rear axle supports, upward projections thereon, downward projections thereon outside of said upward projections, side bars which connect the upward projections on said front and rear axle supports and struts or braces which connect said side bars with the downward projections of said axle-supports, substantially as described.

4. In a vehicle-frame, the combination of an axle-support, an axle pivoted thereto, downward projections on said axle-support provided with vertically-disposed slots which embrace said axle, a side of each of said slots being formed by a plate removably secured to said axle-support, substantially as described.

5. A vehicle-frame comprising front and rear axle supports, upwardly-extending arms thereon, side bars which connect said arms and springs hung from said arms, substantially as described.

6. A vehicle-frame comprising front and rear axle supports, side bars which connect said axle-supports, upward projections on said axle-supports, springs hung from said upward projections, the relation of parts being such that the tops of said springs are substantially on a line with the points of connection to said upward projections on said axle-supports, substantially as described.

7. A vehicle-frame comprising front and rear axle supports, upward projections thereon and springs hung from said upward projections, the relation of parts being such that the tops of said springs are substantially on a line with their points of connection to the upward projections on said axle-supports, substantially as described.

8. A vehicle-frame comprising front and rear axle supports, side bars which connect said axle-supports, an axle pivoted to the front-axle support, downward projections on said front-axle support provided with vertically-disposed slots which embrace said axle and struts or braces which connect said side bars with the downward projections on said front-axle support, substantially as described.

9. A vehicle-frame comprising front and rear axle supports, upward projections thereon, rigid connection between said front and rear axle supports, an axle pivoted to said front-axle support, guides on said front-axle support which embrace said axle and springs hung from the upward projections on said front and rear axle supports, substantially as described.

10. The combination with an axle-support provided with spherically-grooved openings, bearing-boxes provided with grooves in their external surfaces, the bottoms of said grooves forming sections of spheres fitted to and adapted to be secured in the spherically-grooved openings in said axle-support, the portions of said axle-support which enter said grooves in said bearing-boxes being thinner than the width of said grooves and an axle mounted in said bearing-boxes, substantially as described.

In testimony that I claim the foregoing as my invention I affix my signature, in presence of two subscribing witnesses, this 22d day of June, A. D. 1901.

WALTER A. CROWDUS.

Witnesses:
JOHN A. McKEOWN,
M. S. SOMERVILLE.